United States Patent
Saito

(10) Patent No.: US 7,181,514 B2
(45) Date of Patent: Feb. 20, 2007

(54) INTERNET FACSIMILE COMMUNICATION SYSTEM AND INTERNET FACSIMILE COMMUNICATION ADAPTOR

(75) Inventor: Hitoshi Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 807 days.

(21) Appl. No.: 10/272,931

(22) Filed: Oct. 18, 2002

(65) Prior Publication Data
US 2003/0084122 A1   May 1, 2003

(30) Foreign Application Priority Data
Oct. 31, 2001   (JP) .............................. 2001-334076

(51) Int. Cl.
*G06F 15/16* (2006.01)

(52) U.S. Cl. ...................... 709/223; 709/224; 370/352; 379/93.09

(58) Field of Classification Search ................ 709/218, 709/223, 238, 249, 200–202, 224–227; 370/352; 379/93.01, 93.09, 93.11
See application file for complete search history.

(56) References Cited

U.S. PATENT DOCUMENTS

| | | | |
|---|---|---|---|
| 5,448,378 A | 9/1995 | Matsumoto | 358/468 |
| 5,748,712 A | 5/1998 | Nonomura | 379/93 |
| 6,091,968 A * | 7/2000 | Koohgoli et al. | 455/557 |
| 6,278,775 B1 * | 8/2001 | Sih et al. | 379/100.17 |
| 6,311,233 B1 | 10/2001 | Nishioka et al. | 710/14 |
| 6,366,363 B1 | 4/2002 | Harada et al. | 358/434 |
| 6,542,472 B1 * | 4/2003 | Onuma | 370/253 |
| 6,714,988 B2 * | 3/2004 | Takemoto et al. | 709/249 |
| 6,967,958 B2 * | 11/2005 | Ono et al. | 370/401 |
| 2001/0014910 A1 | 8/2001 | Bobo, II | 709/206 |
| 2004/0203785 A1 * | 10/2004 | Sundquist et al. | 455/436 |

FOREIGN PATENT DOCUMENTS

| | | |
|---|---|---|
| EP | 1 119 182 A2 | 7/2001 |
| JP | 6-189015 | 7/1994 |
| JP | 8-102801 | 4/1996 |
| JP | 2000-216911 | 4/2000 |
| JP | 2000-244675 A | 8/2000 |
| WO | WO 95/19089 | 7/1995 |
| WO | WO 00/79780 A1 | 12/2000 |

OTHER PUBLICATIONS

Patent Abstracts of Japan, vol. 1995, No. 9, Jun. 23, 1995 (JP 07 162553 A).
Yu, Shung-Foo, et al. "A multimedia gateway for phone/fax and MIME mail", Computer Communications, Elsevier Science Publishers BV, Amsterdam, Netherlands, vol. 20, No. 8, Aug. 25, 1997, p. 615-627.

* cited by examiner

*Primary Examiner*—Moustafa M. Meky
(74) *Attorney, Agent, or Firm*—Fitzpatrick, Cella, Harper & Scinto

(57) ABSTRACT

An internet facsimile communication system capable, in the internet facsimile based on the Recommendation T.38, of receiving an incoming call for a facsimile communication regardless of the setting of receiving mode in the facsimile apparatus thereby avoiding a drawback that a person responds to a facsimile communication.

The internet facsimile communication system comprises an adaptor for connection with an IP network and a G3 facsimile apparatus, in which the adaptor changes the format of a call signal for calling the G3 facsimile apparatus, between an incoming call for a facsimile communication and other incoming call, thereby informing the G3 facsimile apparatus of an incoming call for the facsimile communication.

6 Claims, 4 Drawing Sheets

1ST CALLING SIG (CI1)

2ND CALLING SIG (CI2)

INTERNET FACSIMILE COMMUNICATION SYSTEM AND INTERNET FACSIMILE COMMUNICATION ADAPTOR

BACKGROUND OF THE INVENTION

1. Field of the Invention

The present invention relates to an internet facsimile communication system provided with (1) an internet facsimile adaptor apparatus which is connectable with a PSTN network and an IP network and is provided also with an analog port, and (2) a facsimile apparatus connected to the above-mentioned analog port.

2. Related Background Art

Recently, the ITU-T issued the Recommendation H.323 as a standard for communication of voice and image through the IP network. Also the ITU-T issued the Recommendation T.38 for real-time facsimile communication utilizing the IP network.

In response thereto, there is commercialized an adaptor based on such recommendations H.323 and T.38.

Such adaptor based on the Recommendations H.323 and T.38 is provided with a port for connection to the IP network and a port for connection to a telephone or a facsimile apparatus. By the adaptor, in case of an incoming call from the IP network, a voice call is subjected to voice encoding/decoding according to the encoding method defined in the Recommendation H.323 so as to ring a telephone set, and in case of a facsimile communication, the communication executed according to the Recommendation T.38 is converted into a system of the Recommendation T.30 so as to call for the facsimile apparatus.

An adaptor of this kind is usually provided with a port for connection to the IP network and also with a port for connection to the PSTN network.

Thus, a channel to be used is switched according to the necessity, since the connection with the IP network alone cannot establish communication with the telephone or the facsimile apparatus connected to the PSTN network.

The facsimile apparatus is to be basically connected to the PSTN network, and, at the reception of a call in such connection, it is not possible to judge whether the content of the communication is a voice communication or a fax communication. On the other hand, since there is a requirement of using one telephone line both for the telephone set and the facsimile apparatus, the facsimile apparatus is mostly provided with plural operation modes such as "TEL mode", "FAX mode", "FAX/TEL switching mode", etc. and is used by switching such modes according to the necessity.

In the above-mentioned "TEL mode", a FAX incoming call is not automatically responded but an incoming call is always responded by the telephone, and the facsimile apparatus is thereafter manually activated if necessary. In the "FAX mode", a FAX incoming call is automatically responded by the facsimile apparatus to initiate a facsimile communication. In the "FAX/TEL switching mode", the facsimile apparatus receives an incoming call and judges whether the counterpart is a person or a facsimile apparatus, and, in case of the person, calls the telephone set, but, in case of the facsimile apparatus, initiates the facsimile communication.

On the other hand, in case of the internet facsimile, the adaptor side can know in advance whether the content of communication is a voice communication by VoIP or a facsimile communication according to T.38.

However, since the adaptor and the facsimile apparatus are usually connected with a two-wire telephone line without any other interface, it is not possible to transmit additional information on the content of connection, so that, depending on the setting of the facsimile apparatus, there may be encountered a drawback that the incoming call is responded by the facsimile apparatus even when the adaptor side knows it is a voice communication, or inversely by the telephone even when the adaptor side knows it is a facsimile communication.

It is easily possible to avoid such drawback by connecting an exclusive I/F between the adaptor and the facsimile apparatus thereby transmitting additional information, but the preparation of such particular facsimile apparatus leads to an increased cost and precludes free combination of the adaptor and the facsimile apparatus, thereby restricting the range of selection.

SUMMARY OF THE INVENTION

The object of the present invention is to provide an internet facsimile communication system and an internet facsimile communication adaptor capable of avoiding a situation where an incoming call evidently identifiable as a facsimile communication is received by a person or an incoming call evidently identifiable as a voice communication is received by a facsimile apparatus and, in case an incoming call cannot be identified as a voice communication or a facsimile communication, there can be executed a telephone preferential mode, a FAX preferential mode or a FAX/TEL auto switching mode according to the setting of the facsimile apparatus.

This object is achieved, according to one aspect of the invention, by providing an internet facsimile adapter which is connectable to a PSTN network and an IP network and is provided with an analog port connectable with a facsimile apparatus. The adapter comprises means for checking whether an incoming call from the PSTN network is received or not, and means for checking whether the content of communication by an incoming call from the IP network is for speech communication or it is for facsimile communication. Also provided are means for executing a calling by (1) sending to the analog port a regular call signal in the PSTN network when the content of communication by the incoming call from the IP network is for the speech communication or when the incoming call from the PSTN network is received, and (2) sending to the analog port a call signal in different from the regular call signal in the PSTN network when the content of communication by the incoming call from the IP network is for the facsimile communication.

DESCRIPTION OF THE PREFERRED EMBODIMENTS

Figure 1:
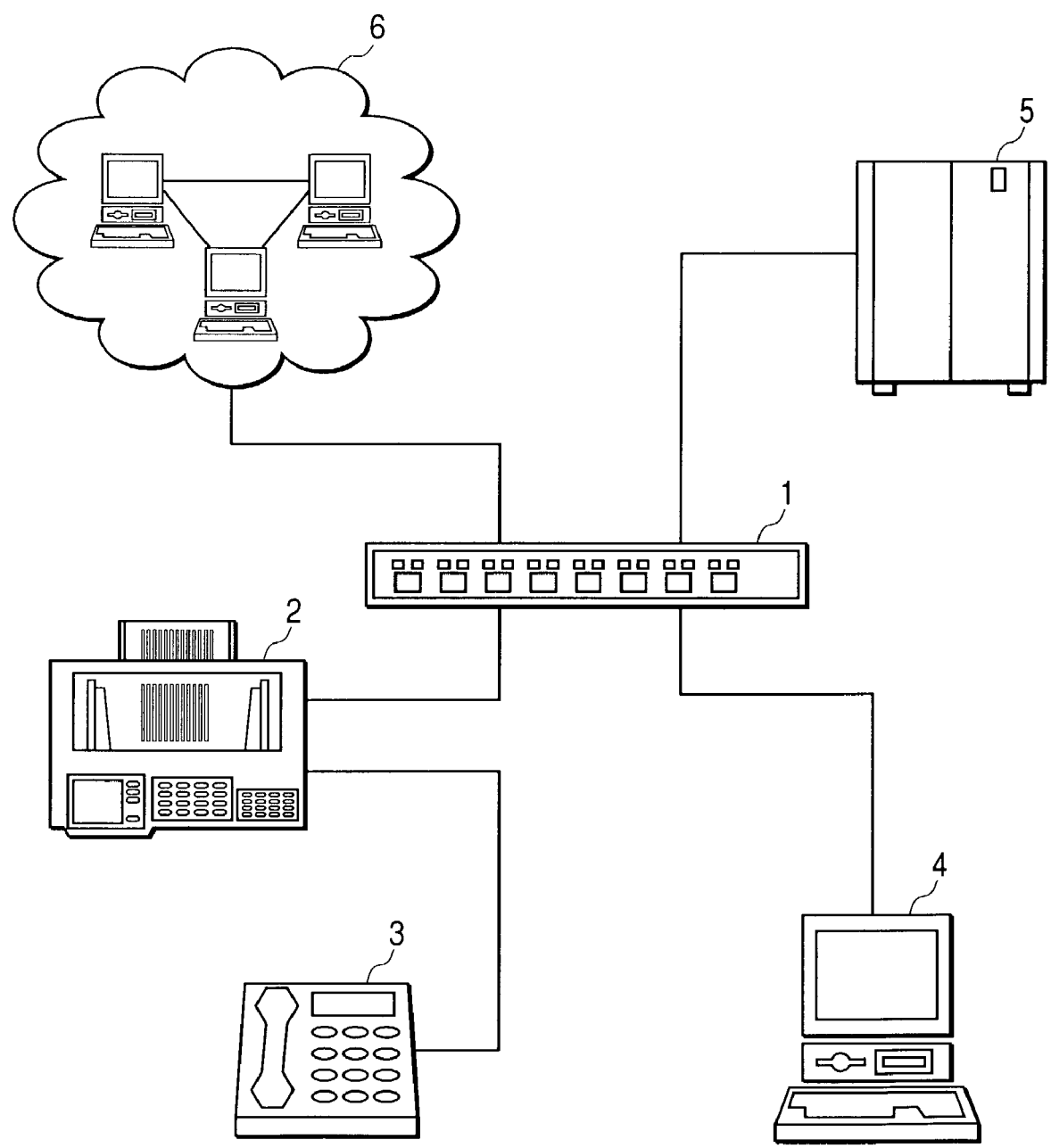
FIG. 1 is a block diagram showing the configuration of an internet facsimile communication system constituting an embodiment of the present invention.

FIG. 1 is a block diagram showing the configuration of an internet facsimile communication system 100 constituting an embodiment of the present invention.

In the internet facsimile communication system 100, an internet facsimile adaptor apparatus 1 connects a PSTN network, a facsimile apparatus 2, a telephone set 3, a PC 4, a station exchange 5 (PSTN network) and an IP network 6, and is provided with an IP port for connection with the IP network 6.

The adaptor apparatus 1 also has a function as a router and is directly connected to the IP network 6 through a channel of a rate of about 128 Kbps, but it is also possible to separate the router therefrom and substitute a router interface. In such case, there can be employed such a rooter interface as 100BASE-T.

The adaptor apparatus 1 is provided with a LINE port for connection with the PSTN network. The PSTN network is assumed to be composed of analog telephone lines, but an ISDN may be used as the PSTN network.

The adaptor apparatus 1 is further provided with an analog port for connection with the telephone set 3, the facsimile apparatus 2, etc., and such analog port is connected to a terminal device such as a telephone set to be compatible in electrical characteristics to the analog PSTN network. In the present embodiment, the adaptor apparatus 1 is provided with a single analog port.

The adaptor apparatus 1 is further provided with a LAN port for connecting thereto a network device such as a PC. In the present embodiment, the LAN port is assumed to be composed of an ordinary Ethernet (trade name) of 100BASE-T.

The ordinary facsimile apparatus 2 is connected to the analog port of the adaptor apparatus 1. The facsimile apparatus 2 is also provided with a TEL port for connection with a child telephone.

The ordinary telephone set 3 is connected, in the present embodiment, to the TEL port of the facsimile apparatus 2, but may also be directly connected to the analog port of the adaptor apparatus 1 in case it has plural analog ports.

The PC 4 is connected to the LAN port of the adaptor apparatus 1.

In addition to the foregoing, there are provided the station exchange 5 for the PSTN network, and the IP network 6.

In the following there will be explained the format of call signals to be employed in the present embodiment.

Figure 2A:
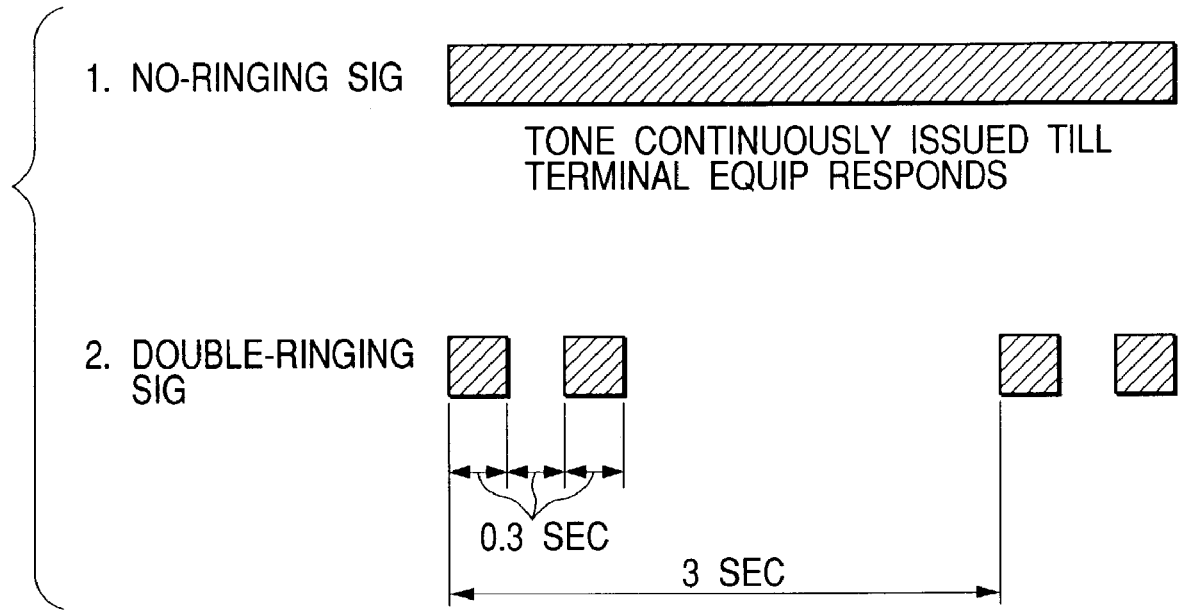
FIGS. 2A and 2B are views showing the format of a call signal to be used in the above-mentioned embodiment.
Figure 2B:
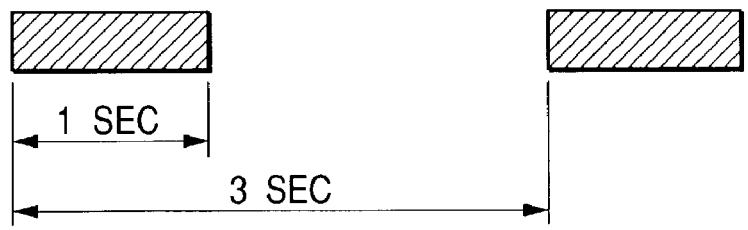

FIGS. 2A and 2B show the formats of the call signals to be used in the present embodiment.

FIG. 2A shows, as a first call signal CI1, a non-ringing call signal (non-ringing call signal for F network) which is a tone signal of 1300 Hz, and a double-ring signal (a call signal of a sequence different from the ordinary call signal used in PSTN network).

The double-ringing signal is a call signal of a different sequence, and is same as a second call signal in the amplitude and in the frequency, but has an ON-time of 300 ms, an OFF-time of 300 ms and an ON-time of 300 ms, within a cycle time of 3 seconds.

FIG. 2B shows a second call signal CI2. The second call signal CI2 has a format commonly used in the PSTN network, and consists, in case of Japan, of an AC signal of 16 Hz at 75 V, having an ON-time of 1 second within a cycle time of 3 seconds.

In the following there will be explained the function of the adaptor apparatus 1 in the present embodiment.

Figure 3:
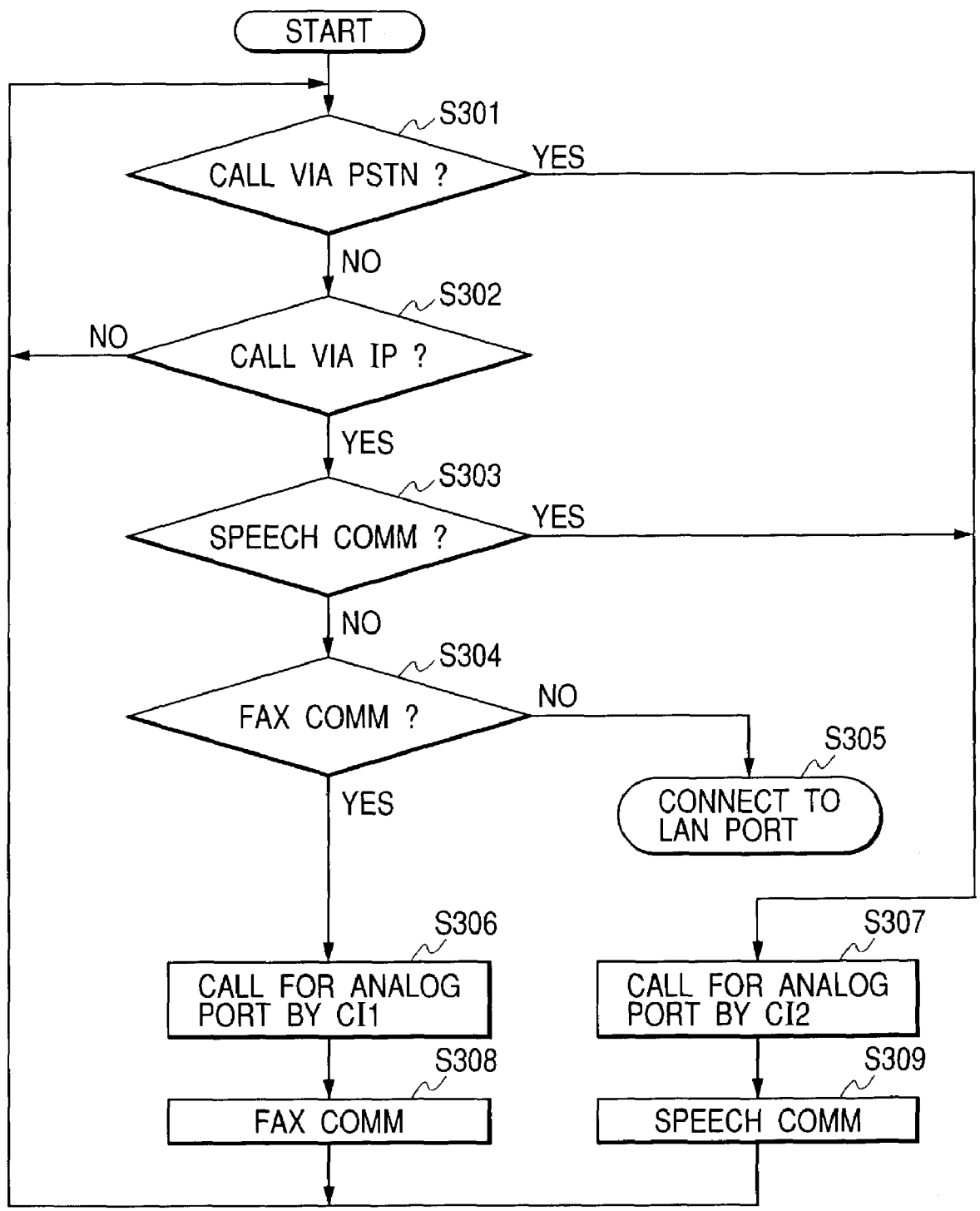
FIG. 3 is a flow chart showing the function of an adaptor apparatus 1 in the above-mentioned embodiment.

FIG. 3 is a flow chart showing the function of the adaptor apparatus 1.

The adaptor apparatus 1, having two channel I/F ports for the PSTN network and the IP network, monitors the incoming call on both channels in a stand-by state.

A step S301 checks whether a PSTN incoming call (an incoming call from the PSTN network) is received. In case the PSTN incoming call is received, whether it is a telephone call or a facsimile call cannot be identified, so that the sequence proceeds to a step S307 to call the analog port with a second call signal CI2.

In case the step S301 determines that the PSTN incoming call is not received, a step S302 checks whether an IP incoming call (an incoming call from the IP network) is received. If the IP incoming call is not received, the sequence returns to the step S301 to repeat the foregoing procedure.

In case the IP incoming call is received (S302), a step S303 checks whether the IP incoming call is for voice communication. If so, a phase A (call setting) of the standard H.323 is initiated, whereby the content of the communication can be confirmed. If the voice communication is thus confirmed, the sequence proceeds to a step S307 to call the analog port by the second call signal CI2.

If the IP incoming call is not for the voice communication (S303), a step S304 checks whether it is for a facsimile communication. In case it is for the facsimile communication, the phase A (call setting) of the standard H.323 also declares a facsimile communication according to T.38, so that the facsimile communication can be confirmed. If the incoming call is not for the a facsimile communication, the sequence proceeds to a step S305 for connection to the LAN port. The function of the LAN port is not contained in a scope of the present embodiment and will not, therefore, be explained further.

In case the IP incoming call for the facsimile communication based on the standard T.38 is confirmed (S304), the sequence proceeds to a step S306 for calling the analog port with the first call signal CI1.

The first call signal CI1 is a non-ringing call signal of the F network, having a tone of 1300 Hz for example, but a double-ring signal can also be used similarly.

Then the facsimile communication is executed (S308). The function of the adaptor during the facsimile communication is same as that defined in the Recommendation T.38 and will not be explained in detail.

In case the communication is terminated in a normal/abnormal state after the facsimile apparatus responds to the first call signal CI1, or in case a calling station disconnects the call while the facsimile apparatus does not respond to the first call signal CI1, the process is terminated and the sequence returns to the start of the process.

Also, after the analog port is called with a second call signal CI2 (S307), there is executed the voice communication (S308). In case the analog port is released after a response to the analog port, or in case the calling station disconnects the call while the second call signal CI2 is not responded, the process is terminated and the sequence returns to the start of the process.

In the foregoing there has been explained the function of the adaptor apparatus 1.

In the following there will be explained the function of the facsimile apparatus side in the present embodiment.

Figure 4:
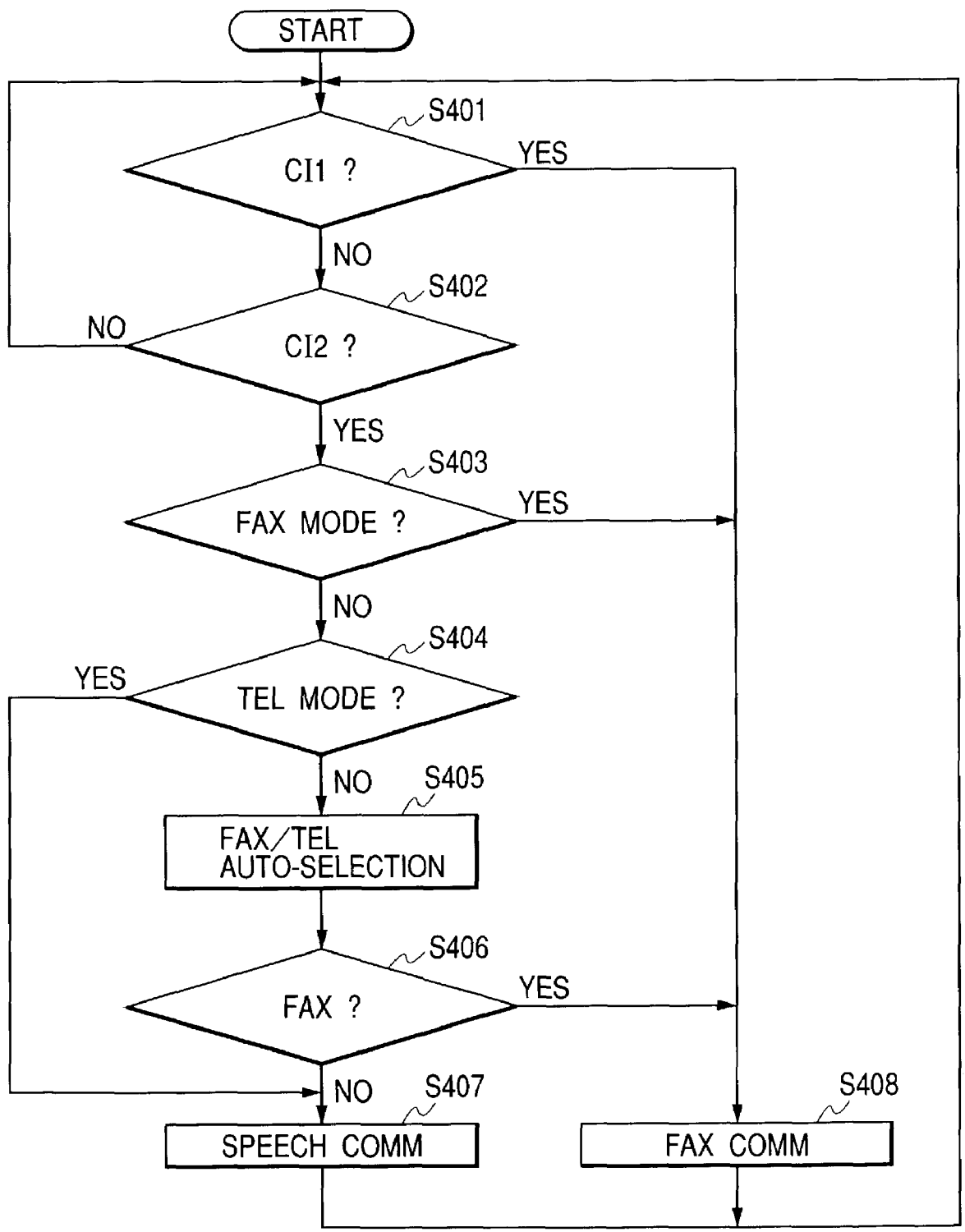
FIG. 4 is a flow chart showing the function of a facsimile apparatus 2 side in the above-mentioned embodiment.

FIG. 4 is a flow chart showing the function of a side of the facsimile apparatus 2 in the present embodiment.

A step S401 checks whether the first call signal CI1 is received. In case the first call signal CI1 is detected, the sequence proceeds to a step S408. In the present embodiment, as explained in the foregoing, the first call signal is assumed to be a non-ringing call signal of the F network, namely a tone of 1300 Hz. Since such non-ringing call signal is exclusive for the facsimile communication, so that the facsimile apparatus unconditionally initiates the facsimile communication.

In case a double-ring signal is used as the first call signal CI1, the facsimile apparatus may recognize that such signal is different from an ordinary call signal but cannot identify that it is for the facsimile communication.

Therefore, the facsimile apparatus is so preset as to unconditionally execute the facsimile communication in case of receiving the aforementioned double-ring signal. The control method itself for switching the operation after a call reception depending on the wave form of the call signal is already known and will not be explained in detail, but such setting allows to use the double-ring signal as the call signal exclusive for the facsimile communication, like the tone signal of 1300 Hz.

In case the first call signal CI1 is not detected (S401), it is checked whether the second call signal CI2, which is similar to the call signal ordinarily used in the PSTN network, is received (S402).

In case the second call signal CI2 is not detected (S402), the sequence returns to the step S401 for repeating the above-explained procedure.

In case the second call signal CI2 is detected (S402), a step S403 checks an operation mode of the facsimile apparatus 2. This check is conducted because an operation of the facsimile apparatus operates according to the setting thereof, since, in case the second call signal CI2 is received, it is not possible to identify whether the incoming call is for the voice communication or for the a facsimile communication.

In case the operation mode is a FAX mode (S403), there is initiated the facsimile communication (S408).

In case the operation mode is not the FAX mode (S403), whether it is a TEL mode is checked (S404). If so (S404), the voice communication is started (S407).

In case the operation mode is not the TEL mode (S404) either, a FAX/TEL auto switching mode is executed (S405). Since this function is already known, there will not be given a detailed explanation, but the facsimile apparatus 2 captures a channel and monitors a signal from a partner station. In this operation, there may be suitably executed the transmission of a voice response or a pseudo ring-back tone. If a CNG signal, namely a tone of 1100 Hz, from the partner station is detected within a predetermined time, the partner station is identified as an apparatus provided with an auto calling function and thus the facsimile communication is initiated (S408).

If the CNG signal cannot be detected, the partner station is probably a person, so that the voice communication is initiated (S407).

In case the operator executes an off-hook operation of the telephone set 3 and then an on-hook operation, or in case the calling station releases the channel before the response of an operator, the step S407 terminates the process and the sequence returns to the start of the procedure.

The facsimile communication (S408) is already known and will not be explained in detail. When the facsimile communication is terminated regardless whether in normal/ abnormal state, the sequence returns to the start of the process.

In the foregoing, there has been explained the process in the side of the facsimile apparatus 2.

The above-described embodiment allows to prevent a situation where an incoming call evidently identifiable as the a facsimile communication is received by a person or the incoming call evidently identifiable as the voice communication is received by the facsimile apparatus 2, and, on the incoming call not identifiable as the voice communication or the facsimile communication, to execute the telephone preferential operation, the facsimile preferential operation or the FAX/TEL auto switching operation according to the setting of the facsimile apparatus.

Also the facsimile apparatus 2 to be used in the present embodiment does not require the addition of any special specification, and as such facsimile apparatus, a commercially ordinary facsimile apparatus is available. Such facsimile apparatus can therefore be freely selected among various models and can be easily obtained with a low cost.

Thus, the above-described embodiment informs whether an incoming call is for the voice communication or for the facsimile communication, by changing the format of the call signal for calling the facsimile apparatus from the adaptor, thereby enabling an appropriate response at the facsimile apparatus.

One of the call signals used in the embodiment is equivalent to that use in the PSTN network, and, in case of Japan, so-called single-ring signal consisting of repetition of an ON state for 1 second and an OFF state for 2 seconds.

Another of the call signals has a format clearly distinguishable from the foregoing, for example a tone signal of 1300 Hz, called as FC used in the non-ringing call-receiving service in the F network, or a so-called double-ring signal consisting of repetition of an ON state for 0.3 seconds, an OFF state for 0.3 seconds, an ON state for 0.3 seconds and an OFF state for 2 seconds.

Most of the facsimile apparatus adapted to the F network in Japan accommodates the first-mentioned FC signal. Also the latter double-ring signal is used in a ringing tone differentiating service in Japan and in a DRPD service in the U.S. Therefore, the facsimile apparatus capable of recognizing the difference of these signals and selecting the operation accordingly is available regardless of a manufacturer.

Consequently, by recognizing the incoming call for the facsimile communication at the adaptor side and executing the activating operations by recognition of these call signals, most of the facsimile apparatus can execute a process matching the incoming call.

The above-described embodiment provides an effect of preventing a situation where an incoming call evidently identifiable as the facsimile communication is received by a person or the incoming call evidently identifiable as the voice communication is received by the facsimile apparatus 2, and, on the incoming call not identifiable as the voice communication or the facsimile communication, executing the telephone preferential operation, the facsimile preferential operation or the FAX/TEL auto switching operation according to the setting of the facsimile apparatus.

What is claimed is:

1. An internet facsimile adapter which is connectable to a PSTN network and an IP network and is provided with an analog port connectable with a facsimile apparatus, said adapter comprising:

checking means for checking whether an incoming call from the PSTN network is received or not;

checking means for checking whether the content of communication by an incoming call from the IP network is for speech communication or it is for facsimile communication; and calling means for executing a calling by (1) sending to the analog port a regular call signal in the PSTN network when the content of communication by the incoming call from the IP network is for the speech communication or when the incoming call from the PSTN network is received and (2) sending to the analog port a call signal in different from the regular call signal in the PSTN network when the content of communication by the incoming call from the IP network is for the facsimile communication.

2. An internet facsimile adapter according to claim 1, wherein the call signal different from the regular call signal in the PSTN network is a non-ringing call signal of 1300 Hz or a double-ring signal.

3. A calling method for an internet facsimile adapter which is connectable to a PSTN network and an IP network and is provided with an analog port connectable with a facsimile apparatus, said method comprising the steps of:

checking whether an incoming call from the PSTN network is received or not;

checking whether the content of communication by an incoming call from the IP network is for speech communication or it is for facsimile communication; and executing a calling by (1) sending to the analog port a regular call signal in the PSTN network when the content of communication by the incoming call from the IP network is for the speech communication or when the incoming call from the PSTN network is received and (2) sending to the analog port a call signal different from the regular call signal in the PSTN network when the content of communication by the incoming call from the IP network is for the facsimile communication.

4. A method according to claim 3, wherein the call signal different from the regular call signal in the PSTN network is a non-ringing call signal of 1300 Hz or a double-ring signal.

5. An internet facsimile adapter which is connectable to a PSTN network and an IP network and is provided with an analog port connectable with a facsimile apparatus, said adapter comprising:

checking means for checking whether an incoming call from the PSTN network is received or not;

checking means for checking whether the content of communication by an incoming call from the IP network is for speech communication or it is not for speech communication; and calling means for executing a calling by (1) sending to the analog port a regular call signal in the PSTN network when the content of communication by the incoming call from the IP network is for the speech communication or when the incoming call from the PSTN network is received and (2) sending to the analog port a call signal different from the regular call signal in the PSTN network when the content of communication by the incoming call from the IP network is not for the speech communication.

6. A calling method for an internet facsimile adapter which is connectable to a PSTN network and an IP network and is provided with an analog port connectable with a facsimile apparatus, said method comprising the steps of:

checking whether an incoming call from the PSTN network is received or not;

checking whether the content of communication by an incoming call from the IP network is for speech communication or it is not for speech communication; and executing a calling by (1) sending to the analog port a regular call signal in the PSTN network when the content of communication by the incoming call from the IP network is for the speech communication or when the incoming call from the PSTN network is received and (2) sending to the analog port a call signal different from the regular call signal in the PSTN network when the content of communication by the incoming call from the IP network is not for the speech communication.

* * * * *

UNITED STATES PATENT AND TRADEMARK OFFICE
CERTIFICATE OF CORRECTION

PATENT NO.       : 7,181,514 B2                                          Page 1 of 1
APPLICATION NO.  : 10/272931
DATED            : February 20, 2007
INVENTOR(S)      : Hitoshi Saito It is certified that error appears in the above-identified patent and that said Letters Patent is hereby corrected as shown below:

COLUMN 2

Line 45, "in different" should read --different--.

COLUMN 3

Line 11, "rooter" should read --router--.

COLUMN 5

Line 15, "exclusive" should read --exclusively--.

COLUMN 6

Line 19, "use" should read --used--.

COLUMN 7

Line 2, "in different" should read --different--.

Signed and Sealed this

Fifteenth Day of April, 2008

JON W. DUDAS
*Director of the United States Patent and Trademark Office*